United States Patent
Xiao et al.

(10) Patent No.: US 8,531,801 B1
(45) Date of Patent: Sep. 10, 2013

(54) METHOD AND SYSTEM FOR PROVIDING A READ TRANSDUCER HAVING A COMPOSITE MAGNETIC SHIELD WITH SMOOTH INTERFACES

(71) Applicant: Western Digital (Fremont), LLC, Fremont, CA (US)

(72) Inventors: Rongfu Xiao, Dublin, CA (US); Yimin Guo, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/723,099

(22) Filed: Dec. 20, 2012

(51) Int. Cl.
*G11B 5/39* (2006.01)

(52) U.S. Cl.
USPC ........................................................ 360/319

(58) Field of Classification Search
USPC .................. 360/123.12, 123.37, 123.58, 319
See application file for complete search history.

(56) References Cited

U.S. PATENT DOCUMENTS

| | | | |
|---|---|---|---|
| 5,838,521 A | 11/1998 | Ravipati | |
| 6,233,116 B1 | 5/2001 | Chen et al. | |
| 6,292,334 B1 | 9/2001 | Koike et al. | |
| 6,358,635 B1 | 3/2002 | Min et al. | |
| 6,456,467 B1 | 9/2002 | Mao et al. | |
| 6,496,335 B2 | 12/2002 | Gill | |
| 7,180,712 B1 | 2/2007 | Li et al. | |
| 7,280,389 B2 | 10/2007 | Guo | |
| 7,606,007 B2 | 10/2009 | Gill | |
| 7,656,611 B2 | 2/2010 | Liu et al. | |
| 7,796,364 B2 * | 9/2010 | Lin | 360/324.11 |
| 7,813,085 B2 | 10/2010 | Anagawa et al. | |
| 8,000,063 B2 * | 8/2011 | Yamaguchi et al. | 360/319 |
| 2002/0064002 A1 | 5/2002 | Gill | |
| 2009/0279213 A1 | 11/2009 | Wu et al. | |
| 2011/0007425 A1 | 1/2011 | Vas'ko et al. | |
| 2011/0249365 A1 | 10/2011 | Zeltser et al. | |

* cited by examiner

*Primary Examiner* — Angel Castro

(57) ABSTRACT

A method and system provide a magnetic transducer including first and second shields, a read sensor, and magnetic bias structure(s) adjacent to the read sensor. The read sensor and magnetic bias structure(s) are between the shields. The second shield includes first and second ferromagnetic layers, a nonmagnetic spacer layer and a pinning layer. The nonmagnetic spacer layer is between the first and second ferromagnetic layers. The first ferromagnetic layer is between the read sensor and the nonmagnetic spacer layer. The pinning layer is adjacent to the second ferromagnetic layer. The first and second ferromagnetic layers are coupled antiparallel. The first ferromagnetic layer includes magnetic layers interleaved with trilayer(s). Each magnetic layer includes crystalline grains. The trilayer(s) include an amorphous nonmagnetic layer less than three Angstroms thick. Thus, the magnetic layers are ferromagnetically coupled but the crystalline grains in different magnetic layers are decoupled.

19 Claims, 7 Drawing Sheets

US 8,531,801 B1

METHOD AND SYSTEM FOR PROVIDING A READ TRANSDUCER HAVING A COMPOSITE MAGNETIC SHIELD WITH SMOOTH INTERFACES

BACKGROUND

FIG. 1 depicts an air-bearing surface (ABS) view of a conventional read transducer 10. The conventional read transducer 10 includes shields 12 and 20, sensor 14 and magnetic bias structures 16. The read sensor 14 is typically a giant magnetoresistive (GMR) sensor or tunneling magnetoresistive (TMR) sensor. The read sensor 14 includes an antiferromagnetic (AFM) layer, a pinned layer, a nonmagnetic spacer layer, and a free layer. Also shown is a capping layer. In addition, seed layer(s) may be used. The free layer has a magnetization sensitive to an external magnetic field. Thus, the free layer functions as a sensor layer for the magnetoresistive sensor 14. The magnetic bias structures 16 may be hard bias structures or soft bias structures 16. These magnetic bias structures are used to magnetically bias the sensor layer of the sensor 14.

Although the conventional transducer 10 functions, there are drawbacks. In particular, the magnetic moment of the shield 20 may be unstable. For example, there may be multiple magnetic domains within the shield 20. Movement of domain walls and other changes to the magnetic moment of the shield 20 may introduce noise or otherwise adversely affect performance of the conventional read transducer 10.

Accordingly, what is needed is a system and method for improving the performance of a magnetic recording read transducer.

BRIEF SUMMARY OF THE INVENTION

A method and system provide a magnetic transducer having an air-bearing surface (ABS). The magnetic transducer includes a first shield, a read sensor, magnetic bias structure(s) and a second shield. The read sensor includes edge(s) which are adjacent to the magnetic bias structure(s). The read sensor and the magnetic bias structure(s) are between the first shield and the second shield. The second shield includes a first ferromagnetic layer, a nonmagnetic spacer layer, a second ferromagnetic layer and a pinning layer. The nonmagnetic spacer layer is between the first ferromagnetic layer and the second ferromagnetic layer. The first ferromagnetic layer is between the read sensor and the nonmagnetic spacer layer. The pinning layer is adjacent to the second ferromagnetic layer. The first ferromagnetic layer is coupled antiparallel with the second ferromagnetic layer. The first ferromagnetic layer includes a plurality of magnetic layers interleaved with at least one trilayer. Each of the magnetic layers includes a plurality of crystalline grains. The trilayer(s) include an amorphous nonmagnetic layer. The amorphous nonmagnetic layer is less than three Angstroms thick such that the magnetic layers are ferromagnetically coupled. The trilayer(s) are configured such that the crystalline grains in one of the magnetic layers are decoupled from the crystalline grains in another of the magnetic layers.

DETAILED DESCRIPTION OF THE PREFERRED EMBODIMENTS

Figure 1:
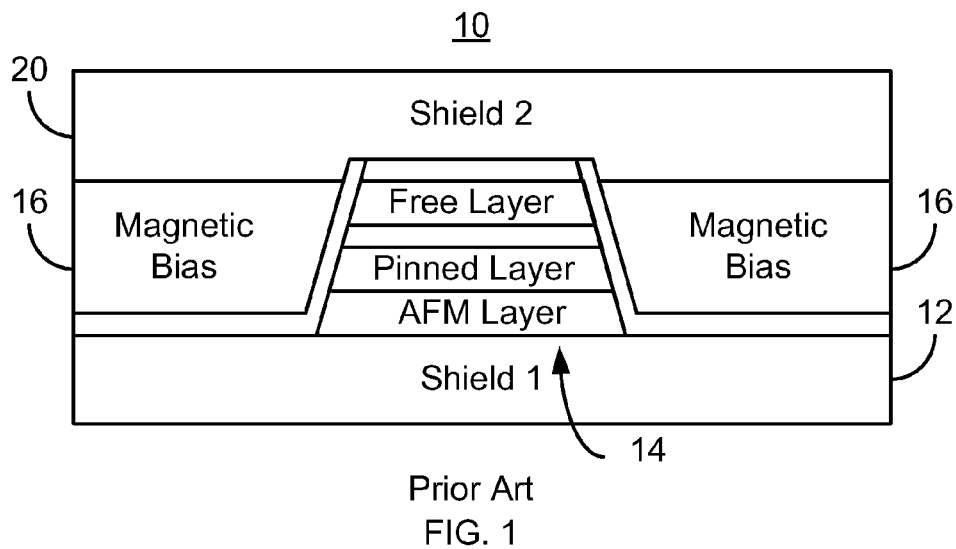
FIG. 1 depicts a conventional read transducer.
Figure 2:
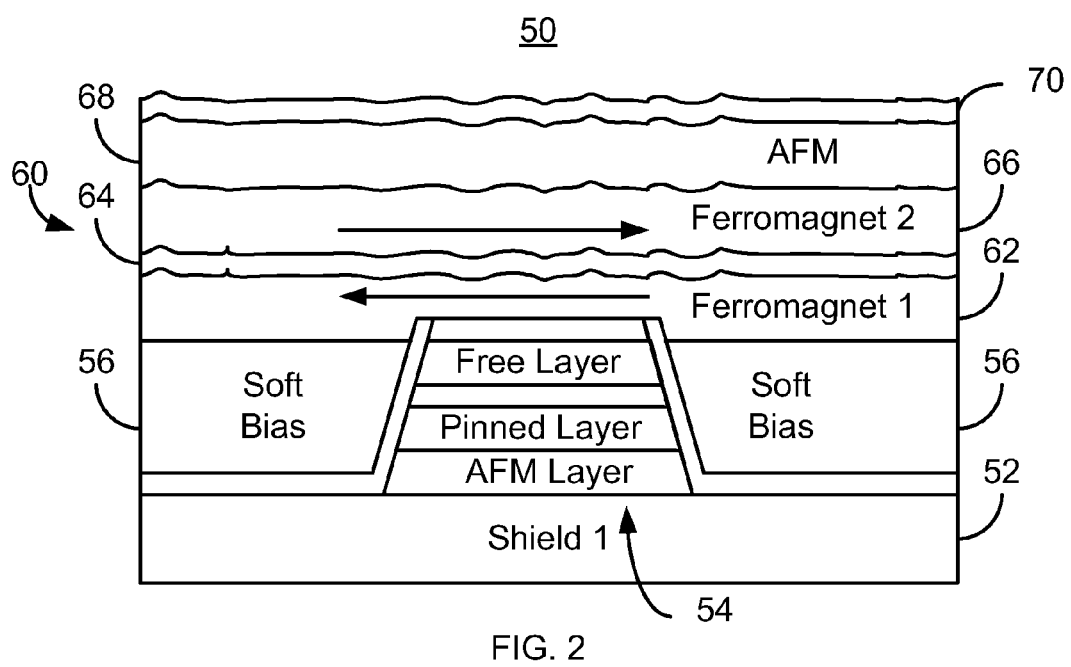
FIG. 2 depicts an ABS view of a more recent magnetic recording read transducer.

FIG. 2 depicts an ABS view of a portion of a more recent magnetic read transducer 50. For clarity, FIG. 2 is not to scale. The read transducer 50 may be part of a read head or may be part of a merged head that also includes a write transducer. The transducer 50 includes shields 52 and 60, a read sensor 54 and soft magnetic bias structures 56. The sensor 54 shown is a GMR or TMR sensor. Thus, the sensor 54 includes a pinning layer, a pinned, a nonmagnetic spacer layer, a free layer, and a capping layer. For simplicity, these layers are not separately labeled in FIG. 2. The sensor 54 may also include seed layer(s) (not shown). Although an AFM layer used to pin the magnetic moment of the pinned layer is shown, in other embodiments, the pinning layer may be omitted or may use a different pinning mechanism. The pinned layer and free layer are each shown as a single layer, but may include multiple layers including but not limited to a synthetic antiferromagnetic (SAF) structure. The nonmagnetic spacer layer may be a conductive layer, a tunneling barrier layer, or other analogous layer. Although depicted as a GMR or TMR sensor, in other embodiments, other structures and other sensing mechanisms may be used for the sensor.

The magnetic bias structures 56 may be soft bias structures fabricated with soft magnetic material(s). The soft magnetic bias structures 56 have a high permeability and a coercivity of less than ten Oe. In some such embodiments, the soft magnetic bias structures 56 have a coercivity of not more than five Oe. For example, the soft magnetic bias structures 56 may include NiFe, such as Permalloy. Because the soft magnetic bias structures 56 have a magnetic moment, the soft magnetic bias structures 56 magnetically bias the free layer.

The magnetic read transducer 50 also includes an antiferromagnetically biased second shield 60. The shield 60 includes ferromagnetic layers 62 and 66, nonmagnetic spacer layer 64, and pinning layer 68. The shield 60 may also include a capping layer 70. The ferromagnetic layers 62 and 66 are separated by nonmagnetic spacer layer 64. The ferromagnetic layers 62 and 66 may include soft magnetic materials, such as NiFe. The nonmagnetic spacer layer 64 may be Ru, which allows the magnetic moments of the layers 62 and 66 to be coupled antiparallel. The moment of the ferromagnetic layer 66 is pinned by the pinning layer 68. The pinning layer is typically an antiferromagnet (AFM), such as IrMn.

Because the more recently developed magnetic transducer 50 has an antiferromagnetically coupled second shield 60, the performance of the magnetic transducer 50 may be improved. More specifically, the domains in the second shield 60 may be stabilized and noise reduced. However, as can be seen in FIG. 2, the interfaces between the layers 62, 64, 66 and 68 are rather rough. Because of the surface roughness of the layers, the utility of the shield 60 may be adversely affected. For example, the top surface of the NiFe layer 62 may be rough. The thickness of the Ru layer 64 varies due to this roughness. This causes a variation in the RKKY coupling between the layers 62 and 66. In general, the RKKY coupling between two ferromagnetic layers oscillates between an antiparallel coupling and parallel coupling based on the thickness of the nonmagnetic layer between the ferromagnetic layers. The coupling between the layers 62 and 66 may vary across the layers because the Ru layer 64 has a varying thickness due to the surface roughness of the layer 62. Consequently, portions of the ferromagnetic layers 62 and 64 may not be coupled antiparallel. Stability of the shield 60 may thus be diminished. Performance of the more recently developed magnetic transducer may thus be adversely affected.

Figure 3:
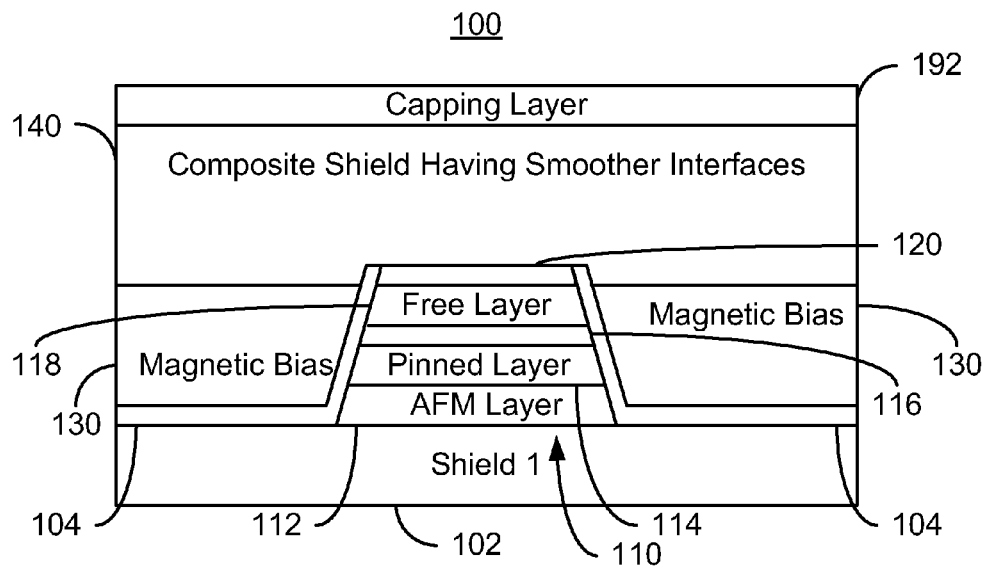
FIG. 3 is an ABS view of an exemplary embodiment of a portion of a magnetic recording read transducer.

FIG. 3 is an ABS view of an exemplary embodiment of a portion of a magnetic recording read transducer 100. For clarity, FIG. 3 is not to scale. The read transducer 100 may be part of a read head or may be part of a merged head that also includes a write transducer. The head of which the read transducer 100 is a part is part of a disk drive having a media, a slider and the head coupled with the slider. The read transducer 100 is also described in the context of particular components. In other embodiments, some of the components may be omitted, provided in a different location, or have different constituents. Further, other components may be used.

The transducer 100 includes a first shield 102, an electric insulator 104, a read sensor 110, magnetic bias structures 130 and a composite shield 140 that may have a capping layer 192. The sensor 110 shown may be a GMR or TMR sensor. Thus, the sensor 110 includes a pinning layer 112, a pinned layer 114, a nonmagnetic spacer layer 116, a free layer 118, and a capping layer 120. The sensor 110 may also include seed layer(s) (not shown). Although an AFM layer 112 used to pin the magnetic moment of the pinned layer 116 is shown, in other embodiments, the pinning layer may be omitted or may use a different pinning mechanism. The pinned layer 114 and free layer 118 are each shown as a single layer, but may include multiple layers including but not limited to a synthetic antiferromagnetic (SAF) structure. The nonmagnetic spacer layer 116 may be a conductive layer, a tunneling barrier layer, or other analogous layer. Although depicted as a GMR or TMR sensor, in other embodiments, other structures and other sensing mechanisms may be used for the sensor 110. The capping layer 192 may include Ru and/or Ta.

The magnetic bias structures 130 may be hard or soft magnetic bias structures. In some embodiments, therefore, the magnetic bias structures are made using soft magnetic material(s). In some embodiments, the soft magnetic bias structures 130 have a high permeability and a coercivity of less than ten Oe. In some such embodiments, the soft magnetic bias structures 130 have a coercivity of not more than five Oe. For example, the soft magnetic bias structures 130 may include NiFe, such as Permalloy. Because the soft magnetic bias structures 130 have a magnetic moment, the soft magnetic bias structures 130 magnetically bias the free layer 118. The soft magnetic bias structures 130 are separated from the sensor 110 by insulating layer 104. Thus, the soft magnetic bias structures 130 are adjacent to the edges of the sensor 110. In the embodiment shown in FIG. 3, the soft magnetic bias structures 130 are also shown as separated from the shield 102 by nonmagnetic layers 104. Thus, the soft magnetic bias structures 130 are magnetically decoupled from the shield 102. However, in alternate embodiments, one or both of the soft magnetic bias structures 130 may be magnetically connected the shield 102.

Figure 4:
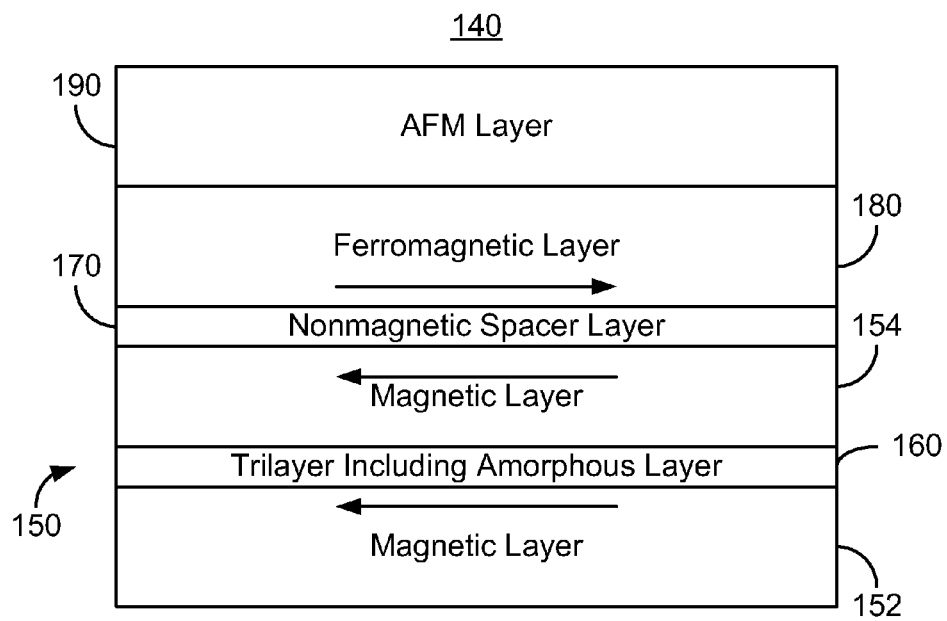
FIG. 4 depicts an ABS view of an exemplary embodiment of a portion of a shield in a magnetic recording read transducer.

The magnetic transducer includes a shield 140. FIG. 4 is an ABS view of an exemplary embodiment of a portion of the shield 140. For clarity, FIG. 4 is not to scale. Referring to FIGS. 3-4, the shield 140 is a composite shield. Thus, the shield 140 includes multiple layers and/or materials rather than being a single monolithic layer. In addition, the interfaces of the layers of the shield 140 are smoother. In the embodiment depicted in FIG. 4, the shield 140 includes two ferromagnetic layers 150 and 180 separated by a nonmagnetic spacer layer 170. The ferromagnetic layers are coupled antiparallel through the nonmagnetic spacer layer 170, for example via an RKKY coupling. In some embodiments, therefore, the nonmagnetic spacer layer 170 may be Ru. The ferromagnetic 150 and 180 may be NiFe. In some embodiments, the shield 140 also includes a pinning layer 190, such as an AFM layer, that pins the magnetic moment of the ferromagnetic layer 180. In some embodiments, the pinning layer 190 includes at least sixty and not more than three hundred Angstroms of IrMn. Thus, one ferromagnetic layer 150 may be adjacent to the magnetic bias structures 130, while the other ferromagnetic layer 180 is adjacent to the pinning layer 190.

In the shield 140, the bottom ferromagnetic layer 150 includes multiple magnetic layers interleaved with one or more trilayer structures 160. In the embodiment shown in FIG. 4, two magnetic layers 152 and 154 and one trilayer structure 160 are shown. However, another number of magnetic layers and a greater number of trilayer structures may be present. Further, as used herein, a trilayer within the shield 140 includes at least three layers, but may include more than three layers. Each of the magnetic layers 152 and 154 includes crystalline grains. The trilayer 160 include one or more amorphous nonmagnetic layers (not shown in FIG. 4), each of which is less than three Angstroms thick. In some embodiments, the amorphous nonmagnetic layer includes one or more of Ta, Ti, Zr, W and Nb. Because the amorphous nonmagnetic layer is sufficiently thin, the magnetic layers 152 and 154 within the bottom ferromagnetic layer are ferromagnetically coupled. However, the trilayer 160 is also configured such that the crystalline grains in one magnetic layer 152 are decoupled from the crystalline grains in another magnetic layer 154. In some embodiments, this decoupling is due to the presence of one or more amorphous layers in the trilayer 160 and/or the presence of multiple trilayers 160.

The presence of the trilayer(s) provides a smoother interface between the ferromagnetic layer 150 and the nonmagnetic spacer layer 170. In the embodiment depicted in FIG. 4, in which only one trilayer 160 is used, the trilayer 160 is at least twenty Angstroms and not more than one hundred Angstroms from the nonmagnetic spacer layer 170. Placing the trilayer 160 at this location may allow the trilayer 160 to break the crystalline grain growth in the magnetic layer 152. Because the trilayer 160 includes amorphous layer(s), the top interface of the trilayer 160 may be smooth even though the bottom interface between the layers 152 and 160 may be rough due to grain growth in the magnetic layer 152. This proximity to the nonmagnetic spacer layer 170 means that the magnetic layer 154 is not more than one hundred Angstroms thick. Thus, the placement of the trilayer 160 may prevent the crystalline grain growth in the magnetic layer 154 from roughening the interface between the layers 150 and 170.

Because of the use of the trilayer 160, the nonmagnetic spacer layer 170 is deposited on a smoother surface. The variation in thickness of the nonmagnetic spacer layer 170 is, therefore, reduced. The magnetic coupling between the magnetic layers 150 and 180 may be more uniform. Thus, the shield 140 may be better stabilized. Performance of the magnetic read transducer 100 may thereby be enhanced.

Figure 5:
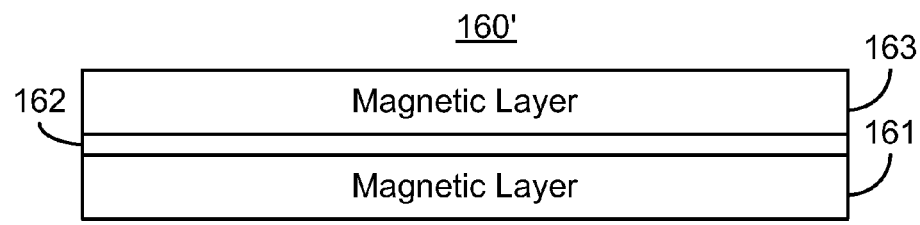
FIG. 5 depicts an exemplary embodiment of a portion of trilayer structure used within a shield in a magnetic recording transducer.
Figure 6:
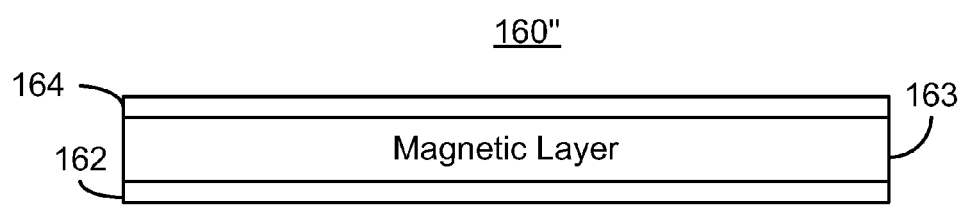
FIG. 6 depicts another exemplary embodiment of a portion of trilayer structure used within a shield in a magnetic recording transducer.
Figure 7:
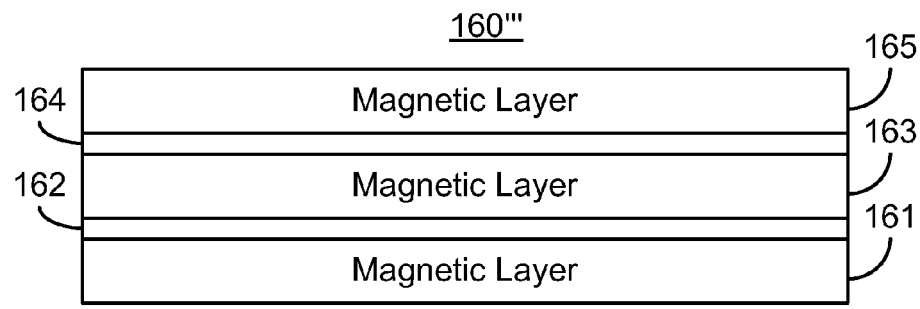
FIG. 7 depicts another exemplary embodiment of a portion of trilayer structure used within a shield in a magnetic recording transducer.

FIGS. 5-7 depict exemplary embodiments of various trilayers 160', 160" and 160''' that may be used for the trilayer 160. For simplicity, FIGS. 5-7 are not to scale. FIG. 5 depicts a trilayer 160' including two ferromagnetic layers 161 and 163 sandwiching the nonmagnetic amorphous layer 162. The amorphous nonmagnetic layer 162 consists of one or more of Ta, Ti, Zr, W and Nb. In some embodiments, the layer 162 may include B. As discussed above, the amorphous nonmagnetic layer 162 is thin. In some embodiments, the amorphous nonmagnetic layer 162 is less than three Angstroms thick. Thus, the magnetic layers 161 and 163, as well as the magnetic layers in ferromagnetic layer 150, may be ferromagnetically coupled through the amorphous nonmagnetic layer 162. In some embodiments, the magnetic layers 161 and 163 include CoFe, CoFeB, and/or Co. The magnetic layers 161 and 163 may be considered amorphous in some embodiments. The magnetic layers 161 and 163 are also thin. For example, the magnetic layers 161 and 163 may be at least two Angstroms and not more than twenty Angstroms thick. In some embodiments, the magnetic layers 161 and 163 may be at least five and not more than ten Angstroms thick. At lower thicknesses, such as two Angstroms, the magnetic layers 161 and 163 may not be continuous.

FIG. 6 depicts a trilayer 160" including two nonmagnetic amorphous layers 162 and 164 sandwiching the magnetic layer 163. Each of the amorphous nonmagnetic layers 162 and 164 consists of one or more of Ta, Ti, Zr, W and Nb. In some embodiments, the layer 162 and/or 164 may include B. As discussed above, the amorphous nonmagnetic layers 162 and 164 are thin. In some embodiments, each of the amorphous nonmagnetic layers 162 and 164 is less than three Angstroms thick. Thus, the magnetic layers in the ferromagnetic layer 150 may be ferromagnetically coupled through the amorphous nonmagnetic layers 162 and 164. In some embodiments, the magnetic layer 161 includes CoFe, CoFeB, and/or Co. The magnetic layer 161 may be considered amorphous in some embodiments. The magnetic layer 161 is also thin. For example, the magnetic layer 161 may be at least two Angstroms and not more than twenty Angstroms thick and, in some embodiments at least five and not more than ten Angstroms. At lower thicknesses, such as two Angstroms, the magnetic layer 161 may not be continuous.

FIG. 7 depicts a trilayer 160''' including three ferromagnetic layers 161, 163 and 165 interleaved with nonmagnetic amorphous layers 162 and 164. Thus, the "trilayer" 160''' may be considered to consist of a trilayer 160' plus a bilayer formed of layers 164 and 165. Each of the amorphous nonmagnetic layers 162 and 164 consists of one or more of Ta, Ti, Zr, W, Nb and B. The amorphous nonmagnetic layers 162, 164 and 166 are thin. In some embodiments, each of the amorphous nonmagnetic layers 162, 164 and 166 is less than three Angstroms thick. Thus, the magnetic layers 161, 163 and 165, as well as the magnetic layers in ferromagnetic layer 150, are ferromagnetically coupled through the amorphous nonmagnetic layers 162 and 164. In some embodiments, the magnetic layers 161, 163 and 165 include CoFe, CoFeB, and/or Co. The magnetic layers 161, 163 and 1645 may be considered amorphous in some embodiments. The magnetic layers 161, 163 and 165 are also thin. For example, the magnetic layers 161, 163 and 165 may each be at least two Angstroms and not more than twenty Angstroms thick. In some such embodiments, each of the magnetic layers 161, 163 and 165 may be at least five and not more than ten Angstroms thick. Note that at lower thicknesses, such as two Angstroms, the magnetic layers 161, 163 and 165 may not be continuous. Although three embodiments 160', 160" and 160''' of trilayer 160 are shown, other structures including another number of magnetic layers and amorphous nonmagnetic layers are possible. For example, the trilayer may include two magnetic layers interleaved with two nonmagnetic amorphous layers. Thus, the outer layers of the trilayer 160 need not be the same. In addition, the number amorphous nonmagnetic layers 162 and/or 164 included may depend upon the number of trilayers 160 used. For example, if a single trilayer is to be used, such as in the shield 140 depicted in FIG. 4, then at least two amorphous nonmagnetic layers may be desired. For example, the trilayer 160" or 160''' may be preferred. This is because it may be desirable to have a total of more than four Angstroms of amorphous material in the ferromagnetic layer 150 of the shield. However, in other embodiments, the number of amorphous nonmagnetic layers 162 and/or 164 provided need not be accounted for.

Referring to FIGS. 3-7, various trilayers including but not limited to the trilayers 160', 160" and 160''' may be used in the shield 140 as the trilayer 160. Because of the use of the trilayer 160, 160', 160" and/or 160''' the nonmagnetic spacer layer 170 is deposited on a smoother surface. The variation in thickness of the nonmagnetic spacer layer 170 is, therefore, reduced. The magnetic coupling between the magnetic layers 150 and 180 may be more uniform. Thus, the shield 140 may be better stabilized. Performance of the magnetic read transducer 100 may thereby be enhanced.

Figure 8:
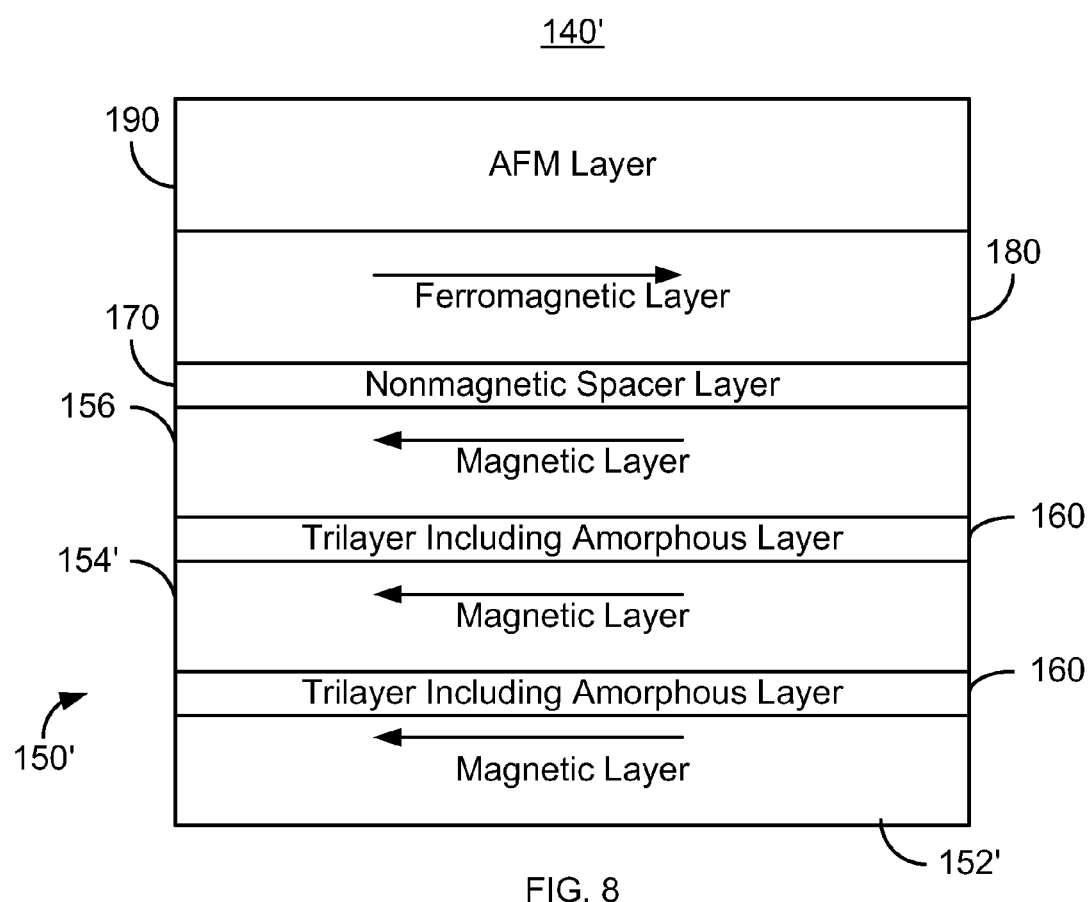
FIG. 8 depicts another exemplary embodiment of a portion of a shield in a magnetic recording read transducer.

FIG. 8 depicts another exemplary embodiment of a magnetic shield 140' that may be used in a read transducer such as the read transducer 100. For clarity, FIG. 8 is not to scale. The shield 140' is a composite shield. The magnetic shield 140' is analogous to the magnetic shield 140. The magnetic shield 140' thus includes ferromagnetic layers 150' and 180, nonmagnetic spacer layer 170 and pinning layer 190 that are analogous to ferromagnetic layers 150 and 180, nonmagnetic spacer layer 170 and pinning layer 190, respectively. The ferromagnetic layers 150' and 180 are coupled antiparallel through the nonmagnetic spacer layer 170, for example via an RKKY coupling. The ferromagnetic layers 150' and 180 may include NiFe. In some embodiments, the pinning layer 190 includes at least sixty and not more than three hundred Angstroms of IrMn.

In the shield 140', the bottom ferromagnetic layer 150' includes multiple magnetic layers interleaved with two trilayers 160. In the embodiment shown in FIG. 8, three magnetic layers 152', 154' and 156 and two trilayers 160 are shown. However, another number of magnetic layers and a different number of trilayers may be present. Although trilayers are denoted with reference numeral 160, the trilayers structures 160', 160", 160''' and/or analogous trilayer structures might be used.

Each of the magnetic layers 152', 154' and 156 includes crystalline grains. In some embodiments, the magnetic layers 152', 154' and 156 include NiFe. The trilayers 160 include one or more amorphous nonmagnetic layer(s), each of which is less than three Angstroms thick. In some embodiments, the amorphous nonmagnetic layer includes one or more of Ta, Ti, Zr, W, Nb and B. Because the amorphous nonmagnetic layer(s) are sufficiently thin, the magnetic layers 152', 154' and 156 within the ferromagnetic layer 150' are ferromagnetically coupled. However, the trilayers 160 are also configured such that the crystalline grains in the magnetic layers 152', 154' and 156 are decoupled from the crystalline grains in the other magnetic layers 152', 154' and 156. This breaking of the coupling between crystalline grains may reduce the surface roughness of the layer 150'. In addition, the spacing of the trilayers 160 may be selected to ensure that the magnetic layers 152', 154' and 156 have a reduced surface roughness. For example, in some embodiments, the ferromagnetic layer 150' is desired to have at least three hundred Angstroms of thickness of NiFe. The magnetic layers 152' and 154' may then be at least one hundred and not more than two hundred Angstroms thick. The magnetic layer 156 closest to the nonmagnetic spacer layer 170 may be desired to be thinner. For example, in some embodiments, the layer 156 closest to the nonmagnetic spacer layer may be at least twenty Angstroms thick and not more than one hundred Angstroms thick. However, in other embodiments, other thicknesses are possible.

The presence of the trilayer(s) 160 provides a smoother interface between the ferromagnetic layer 150' and the nonmagnetic spacer layer 170. The nonmagnetic spacer layer 170 is, therefore, deposited on a smoother surface. The variation in thickness of the nonmagnetic spacer layer 170 is reduced. The magnetic coupling between the magnetic layers 150' and 180 may be more uniform. Thus, the shield 140' may be better stabilized. Performance of the magnetic read transducer 100 may thereby be enhanced.

Figure 9:
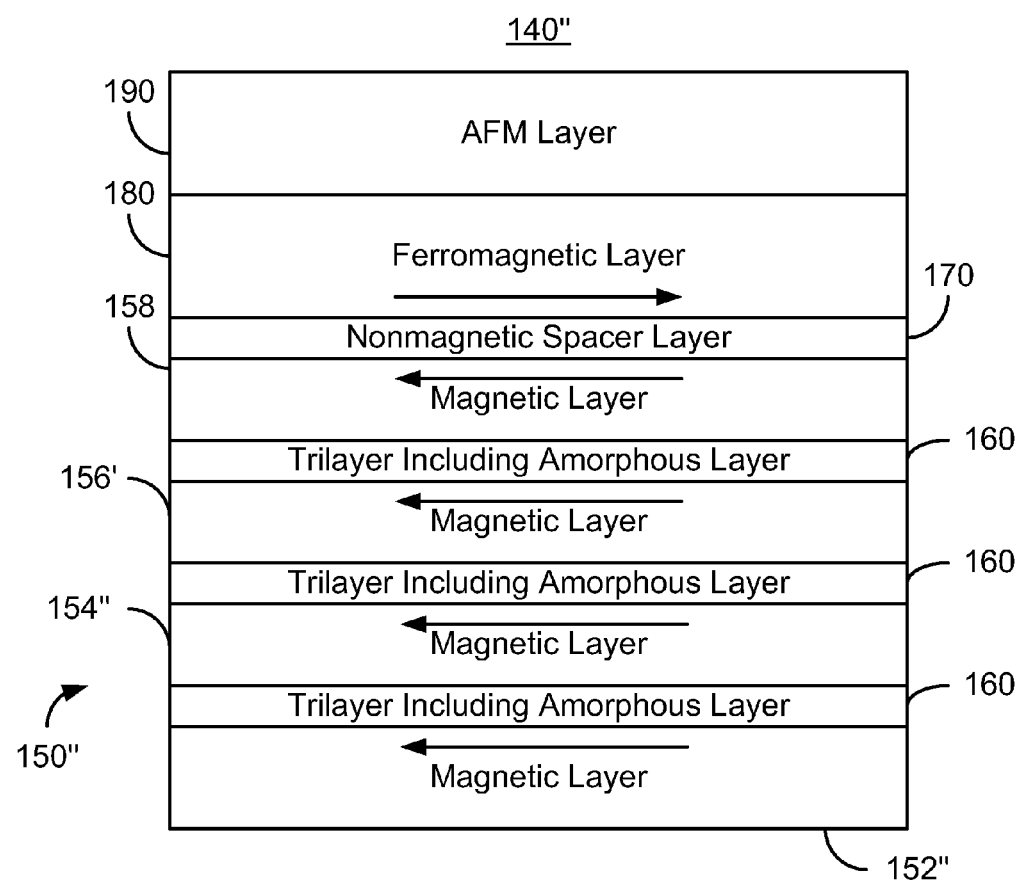
FIG. 9 depicts another exemplary embodiment of a portion of a shield in a magnetic recording read transducer.

FIG. 9 depicts another exemplary embodiment of a magnetic shield 140" that may be used in a read transducer such as the read transducer 100. For clarity, FIG. 9 is not to scale. The shield 140" is a composite shield. The magnetic shield 140" is analogous to the magnetic shields 140 and 140'. The magnetic shield 140" thus includes ferromagnetic layers 150" and 180, nonmagnetic spacer layer 170 and pinning layer 190 that are analogous to ferromagnetic layers 150/150' and 180, nonmagnetic spacer layer 170 and pinning layer 190, respectively. The ferromagnetic layers 150" and 180 are coupled antiparallel through the nonmagnetic spacer layer 170, for example via an RKKY coupling. The ferromagnetic layers 150" and 180 may include NiFe. In some embodiments, the pinning layer 190 includes at least sixty and not more than three hundred Angstroms of IrMn.

In the shield 140", the bottom ferromagnetic layer 150" includes multiple magnetic layers interleaved with three trilayers 160. In the embodiment shown in FIG. 9, four magnetic layers 152", 154", 156' and 158 and three trilayers 160 are shown. However, another number of magnetic layers and a different number of trilayers may be present. Although trilayers are denoted with reference numeral 160, the trilayers structures 160', 160", 160''' and/or analogous trilayer structures might be used.

Each of the magnetic layers 152", 154", 156' and 158 includes crystalline grains. In some embodiments, the magnetic layers 152", 154", 156' and 158 include NiFe. The trilayers 160 include one or more amorphous nonmagnetic layer(s), each of which is less than three Angstroms thick. In some embodiments, the amorphous nonmagnetic layer includes one or more of Ta, Ti, Zr, W, Nb and B. Because the amorphous nonmagnetic layer(s) are sufficiently thin, the magnetic layers 152", 154", 156' and 158 within the ferromagnetic layer 150 are ferromagnetically coupled. However, the trilayers 160 are also configured such that the crystalline grains in the magnetic layers 152", 154", 156' and 158 are decoupled from the crystalline grains in the other magnetic layers 152", 154", 156' and 158. This breaking of the coupling between crystalline grains may reduce the surface roughness of the layer 150". In addition, the spacing of the trilayers 160 may be selected to ensure that the magnetic layers 152", 154", 156' and 158 have a reduced surface roughness. For example, in some embodiments, the ferromagnetic layer 150" is desired to have at least three hundred Angstroms of thickness of NiFe. The magnetic layers 152", 154" and 156' may then be at least one hundred and not more than one hundred and fifty Angstroms thick. The magnetic layer 158 closest to the nonmagnetic spacer layer 170 may be desired to be thinner. For example, in some embodiments, the layer 158 closest to the nonmagnetic spacer layer may be at least twenty Angstroms thick and not more than one hundred Angstroms thick. However, in other embodiments, other thicknesses are possible.

The presence of the trilayer(s) 160 provides a smoother interface between the ferromagnetic layer 150" and the nonmagnetic spacer layer 170. The nonmagnetic spacer layer 170 is, therefore, deposited on a smoother surface. The variation in thickness of the nonmagnetic spacer layer 170 is reduced. The magnetic coupling between the magnetic layers 150" and 180 may be more uniform. Thus, the shield 140" may be better stabilized. Performance of the magnetic read transducer 100 may thereby be enhanced.

Figure 10:
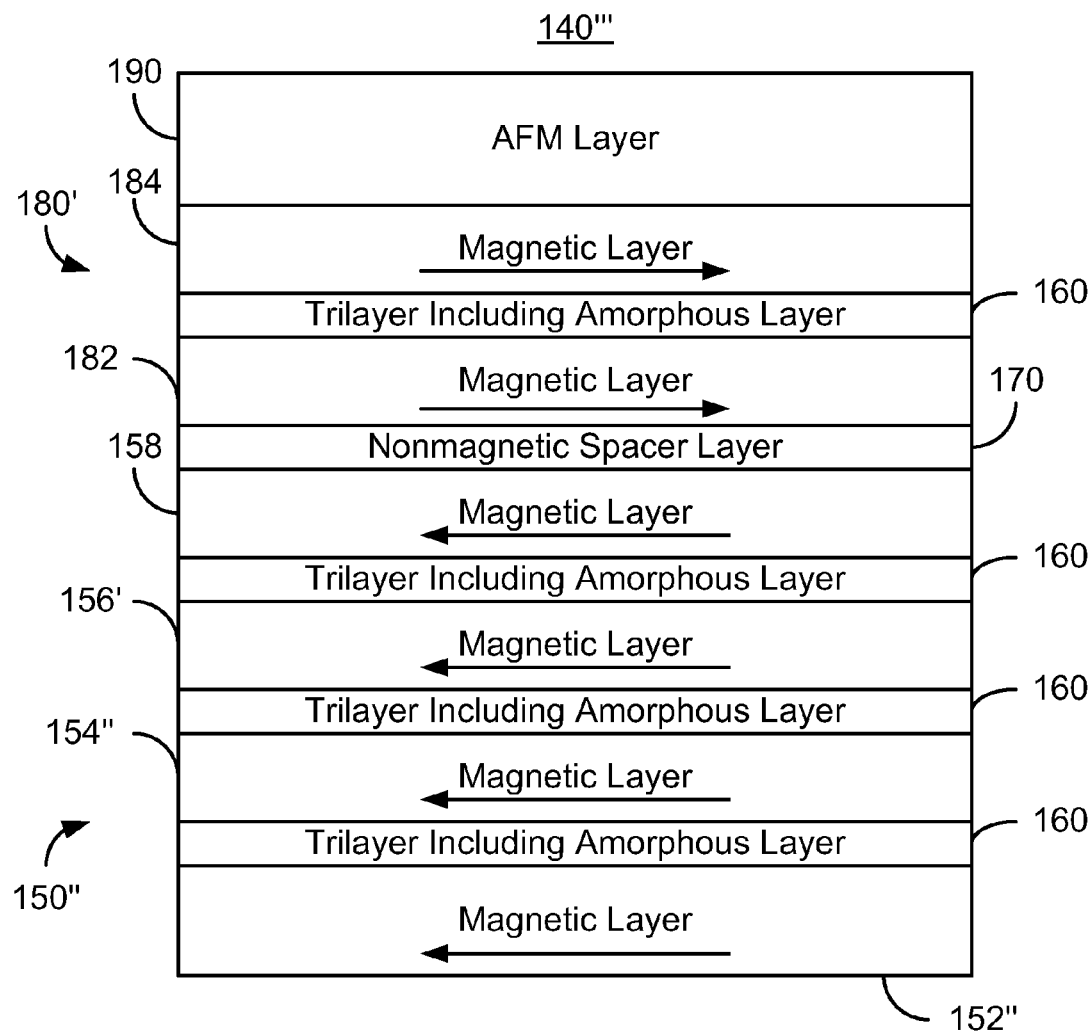
FIG. 10 depicts another exemplary embodiment of a portion of a shield in a magnetic recording read transducer.

FIG. 10 depicts another exemplary embodiment of a magnetic shield 140''' that may be used in a read transducer such as the read transducer 100. For clarity, FIG. 10 is not to scale. The shield 140''' is a composite shield. The magnetic shield 140" is analogous to the magnetic shields 140, 140' and 140". The magnetic shield 140''' thus includes ferromagnetic layers 150" and 180', nonmagnetic spacer layer 170 and pinning layer 190 that are analogous to ferromagnetic layers 150/150'/150" and 180, nonmagnetic spacer layer 170 and pinning layer 190, respectively. The ferromagnetic layers 150''' and 180' are coupled antiparallel through the nonmagnetic spacer layer 170, for example via an RKKY coupling. The ferromagnetic layers 150''' and 180' may include NiFe. In some embodiments, the pinning layer 190 includes at least sixty and not more than three hundred Angstroms of IrMn.

In the shield 140''', the bottom ferromagnetic layer 150" is substantially the same as depicted in FIG. 9. In other embodiments, other ferromagnetic layers including but not limited to 150 and 150' may be used. Thus, the layer 150" includes multiple magnetic layers 152", 154", 156' and 158 interleaved with trilayers 160. Thus, the ferromagnetic layer 150" has a smoother surface for reasons analogous to those discussed above. In addition, the ferromagnetic layer 180' includes magnetic layers 182 and 184 interleaved with trilayer 160. In some embodiments, the magnetic layers 182 and 184 include NiFe. In some embodiments, the trilayers 160', 160", 160''' or an analogous trilayer may be used for the trilayer 160. The magnetic layers 182 and 184 each include crystalline grains. The trilayer 160 includes one or more amorphous nonmagnetic layer(s), each of which is less than three Angstroms thick. In some embodiments, the amorphous nonmagnetic layer includes one or more of Ta, Ti, Zr, W, Nb and B. Because the amorphous nonmagnetic layer(s) are sufficiently thin, the magnetic layers 182 and 184 within the ferromagnetic layer 180' are ferromagnetically coupled. However, the trilayers 160 are also configured such that the crystalline grains in the magnetic layers 182 and 184 are decoupled from the crystalline grains in the other magnetic layers 182 and 184. This breaking of the coupling between crystalline grains may reduce the surface roughness of the layer 180'. In other embodiments, additional trilayers 160 and nonmagnetic layers (not shown) may be included in the ferromagnetic layer 180'.

The presence of the trilayer(s) 160 provides a smoother interface between the ferromagnetic layer 150" and the nonmagnetic spacer layer 170. The variation in thickness of the nonmagnetic spacer layer 170 may be reduced and the magnetic coupling between the magnetic layers 150" and 180' may be more uniform. Thus, the shield 140'" may be better stabilized. Further, the surface roughness of the magnetic layer 180' may be reduced. Thus, subsequent layers such as the AFM layer 190 and capping layer 192 may be smoother. Performance of the magnetic read transducer 100 may thereby be enhanced.

Figure 11:
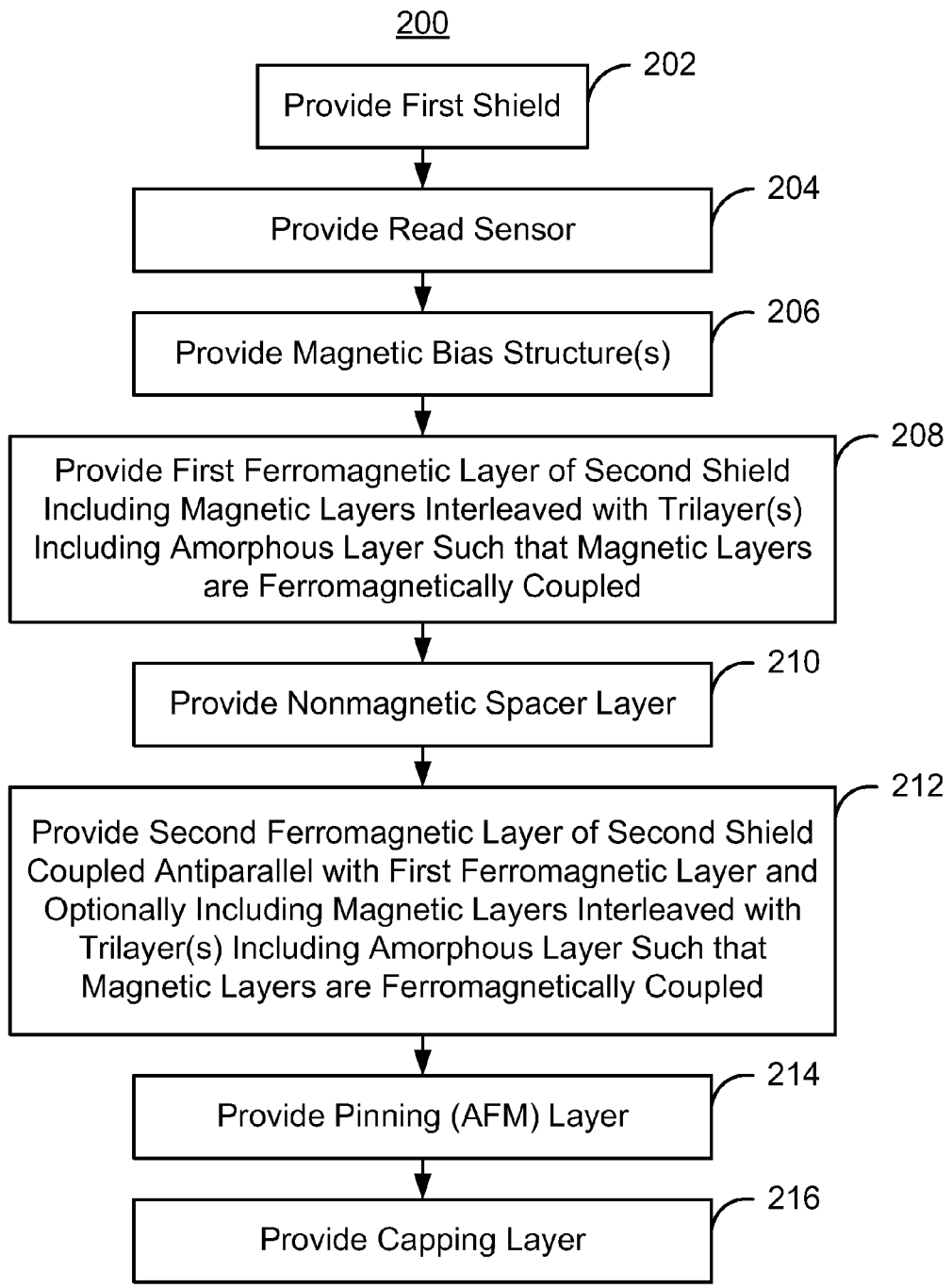
FIG. 11 is flow chart depicting an exemplary embodiment of a method for fabricating a magnetic recording read transducer.

FIG. 11 is an exemplary embodiment of a method 200 for providing a read transducer including a composite shield. For simplicity, some steps may be omitted, interleaved, and/or combined. The method 200 is also described in the context of providing a single recording transducer 100 and shield 140 depicted in FIGS. 3-4. However, the method 200 may be used to fabricate multiple transducers at substantially the same time. The method 200 may also be used to fabricate other shields including but not limited to any combination of 140', 140" and/or 140'" using the trilayers 160, 160', 160" and/or 160'". The method 200 is also described in the context of particular layers. A particular layer may include multiple materials and/or multiple sub-layers. The method 200 also may start after formation of other portions of the magnetic recording transducer.

The first shield 102 is provided, via step 202. Step 202 typically includes depositing a large high permeability layer. The sensor 110 is provided, via step 204. Step 204 typically includes depositing the layers for the sensor 110, then defining the sensor 110 in at least the track width direction using an ion mill. In some embodiments, the free layer 118 and pinned layer 114 of the sensor 110 are also defined in the stripe height direction.

The magnetic bias structures 130 are provided, via step 206. The magnetic bias structures 130 may be soft magnetic bias structures. Step 206 may thus include depositing the high permeability and any other material(s) for the magnetic bias structures 130 and defining the magnetic bias structures 130 in the track width and stripe height direction. In some embodiments, portions of steps 204 and 206 are interleaved. For example, portions of the sensor 110 may be defined in the stripe height direction as the soft magnetic bias structures are defined in the stripe height direction. Step 206 may also include depositing multiple layers for the soft magnetic bias structures 130. Further, in some embodiments, the soft magnetic bias structures 130 are provided such that they may be magnetically coupled to the shield 102 and/or 140.

The shield 140 is provided in steps 208, 210, 212, 214 and 216. In some embodiments, steps 208, 210, 212, 214 and 216 are performed as a single processing block in a single deposition system. Thus, the ferromagnetic layer 150 including trilayer(s) 160 and magnetic layers 152 and 154 are provided, via step 208. Thus, NiFe layers such as layers 152/152', 154/154', 156'/156' and 158 are provided along with trilayer(s) 160. Thus, the magnetic layers 152/152', 154/154', 156'/156' and 158 are ferromagnetically coupled. In addition, the crystallographic grains of the magnetic layers 152/152', 154/154', 156'/156' and 158 are decoupled.

The nonmagnetic spacer layer 170 is provided, via step 210. Step 210 may thus include depositing a Ru layer. The second ferromagnetic layer 180/180' is provided, via step 212. In some embodiments, step 212 includes depositing a magnetic layer such as the layer 180. In other embodiments, step 212 may optionally include providing a ferromagnetic layer 180' including trilayers 160 and magnetic layers 182 and 184, or an analogous ferromagnetic layer. Thus, NiFe layers such as layers 182 and 182 may be provided along with trilayer(s) 160. Thus, the magnetic layers 182 and 184 are ferromagnetically coupled. In addition, the crystallographic grains of the magnetic layers 182 and 184 are decoupled.

A pinning layer such as the layer 190 may be provided, via step 214. For example, step 214 may include depositing a layer of IrMn. A capping layer 192, for example Ru and/or Ta, may also be provided, via step 214. Fabrication of the transducer 100 may then be completed.

Using the method 200, the transducers 100 including a composite shield such as the shields 140, 140', 140" or 140'" may be fabricated. Thus, the benefits of the transducer 100 and one or more of the shields 140, 140', 140" and/or 140'" may be achieved.

We claim:

1. A magnetic transducer having an air-bearing surface (ABS) and comprising:
   a first shield;
   a read sensor including at least one edge;
   at least one magnetic bias structure adjacent to the at least one edge; and
   a second shield, the read sensor and the at least one magnetic bias structure residing between the first shield and the second shield, the second shield including a first ferromagnetic layer, a nonmagnetic spacer layer, a second ferromagnetic layer and a pinning layer, the nonmagnetic spacer layer residing between the first ferromagnetic layer and the second ferromagnetic layer, the first ferromagnetic layer residing between the read sensor and the nonmagnetic spacer layer, the pinning layer being adjacent to the second ferromagnetic layer, the first ferromagnetic layer being coupled antiparallel with the second ferromagnetic layer, the first ferromagnetic layer including a plurality of magnetic layers interleaved with at least one trilayer, each of the plurality of magnetic layers including a plurality of crystalline grains, the at least one trilayer including an amorphous nonmagnetic layer, the amorphous nonmagnetic layer being less than three Angstroms thick such that the plurality of magnetic layers are ferromagnetically coupled, the at least one trilayer being configured such that the plurality of crystalline grains in one of the plurality of magnetic layers are decoupled from the plurality of crystalline grains in another of the plurality of magnetic layers.

2. The magnetic transducer of claim 1 wherein the amorphous nonmagnetic layer includes at least one of Ta, Ti, Zr, W and Nb.

3. The magnetic read transducer of claim 1 wherein the trilayer includes a plurality of ferromagnetic sublayers sandwiching the amorphous nonmagnetic layer.

4. The magnetic read transducer of claim 1 wherein the trilayer includes at a ferromagnetic sublayer sandwiched by the amorphous nonmagnetic layer and an additional amorphous nonmagnetic layer.

5. The magnetic read transducer of claim 1 further comprising:
   a bilayer adjoining each of the at least one trilayer, the bilayer including an additional ferromagnetic layer and an additional amorphous nonmagnetic layer, the additional amorphous nonmagnetic layer being less than three Angstroms thick.

6. The magnetic read transducer of claim 1 wherein the at least one trilayer is a single trilayer, the single trilayer being at least twenty Angstroms and not more than one hundred Angstroms from the nonmagnetic spacer layer.

7. The magnetic read transducer of claim 1 wherein the nonmagnetic spacer layer is Ru.

8. The magnetic read transducer of claim 1 wherein the second magnetic layer further includes an additional plurality of magnetic layers interleaved with at least an additional trilayer, each of the additional plurality of magnetic layers including an additional plurality of crystalline grains, the at least one additional trilayer including an additional amorphous nonmagnetic layer, the additional amorphous nonmagnetic layer being less than three Angstroms thick such that the additional plurality of magnetic layers are ferromagnetically coupled, the at least one additional trilayer being configured such that the additional plurality of crystalline grains in one of the additional plurality of magnetic layers are decoupled from the additional plurality of crystalline grains in another of the additional plurality of magnetic layers.

9. The magnetic transducer of claim 1 wherein the magnetic bias structure is a soft magnetic bias structure.

10. A disk drive comprising:
 a media;
 a slider including a magnetic read transducer having an air-bearing surface (ABS), the magnetic read transducer including a first shield, a read sensor including at least one edge, at least one magnetic bias structure and a second shield, the read sensor and the at least one magnetic bias structure residing between the first shield and the second shield, the second shield including a first ferromagnetic layer, a nonmagnetic spacer layer, a second ferromagnetic layer and a pinning layer, the nonmagnetic spacer layer residing between the first ferromagnetic layer and the second ferromagnetic layer, the first ferromagnetic layer residing between the read sensor and the nonmagnetic spacer layer, the pinning layer being adjacent to the second ferromagnetic layer, the first ferromagnetic layer being coupled antiparallel with the second pinned layer, the first ferromagnetic layer including a plurality of magnetic layers interleaved with at least one trilayer, each of the plurality of magnetic layers including a plurality of crystalline grains, the at least one trilayer including an amorphous nonmagnetic layer, the amorphous nonmagnetic layer being less than three Angstroms thick such that the plurality of magnetic layers are ferromagnetically coupled, the at least one trilayer being configured such that the plurality of crystalline crystalline grains in one of the plurality of magnetic layers are decoupled from the plurality of crystalline grains in another of the plurality of magnetic layers.

11. A method for providing a magnetic read transducer having an air-bearing surface (ABS) comprising:
 providing a first shield;
 providing a read sensor including at least one edge;
 providing at least one magnetic bias structure adjacent to the at least one edge; and
 providing a second shield, the read sensor and the at least one magnetic bias structure residing between the first shield and the second shield, the second shield including a first ferromagnetic layer, a nonmagnetic spacer layer, a second ferromagnetic layer and a pinning layer, the nonmagnetic spacer layer residing between the first ferromagnetic layer and the second ferromagnetic layer, the first ferromagnetic layer residing between the read sensor and the nonmagnetic spacer layer, the pinning layer being adjacent to the second ferromagnetic layer, the first ferromagnetic layer being antiferromagnetically coupled with the second pinned layer, the first ferromagnetic layer including a plurality of magnetic layers interleaved with at least one trilayer, each of the plurality of magnetic layers including a plurality of crystalline grains, the at least one trilayer including an amorphous nonmagnetic layer, the amorphous nonmagnetic layer being less than three Angstroms thick such that the plurality of magnetic layers are ferromagnetically coupled, the at least one trilayer being configured such that the plurality of crystalline grains in one of the plurality of magnetic layers are decoupled from the plurality of crystalline grains in another of the plurality of magnetic layers.

12. The method of claim 11 wherein the amorphous nonmagnetic layer includes at least one of Ta, Ti, Zr, W and Nb.

13. The method of claim 11 wherein the trilayer includes a plurality of ferromagnetic sublayers sandwiching the amorphous nonmagnetic layer.

14. The method of claim 11 wherein the trilayer includes a ferromagnetic sublayer sandwiched by the amorphous nonmagnetic layer and another amorphous nonmagnetic layer.

15. The method of claim 11 further comprising:
 providing a bilayer adjoining each of the at least one trilayer, the bilayer including an additional ferromagnetic layer and an additional amorphous nonmagnetic layer, the additional amorphous nonmagnetic layer being less than three Angstroms thick.

16. The method of claim 11 wherein the at least one trilayer is a single trilayer, the single trilayer being at least twenty Angstroms and not more than one hundred Angstroms from the nonmagnetic spacer layer.

17. The method of claim 11 wherein the nonmagnetic spacer layer is Ru.

18. The method of claim 11 wherein the second magnetic layer further includes an additional plurality of magnetic layers interleaved with at least an additional trilayer, each of the additional plurality of magnetic layers including an additional plurality of crystalline grains, the at least one additional trilayer including an additional amorphous nonmagnetic layer, the additional amorphous nonmagnetic layer being less than three Angstroms thick such that the additional plurality of magnetic layers are ferromagnetically coupled, the at least one additional trilayer being configured such that the additional plurality of crystalline grains in one of the additional plurality of magnetic layers are decoupled from the additional plurality of crystalline grains in another of the additional plurality of magnetic layers.

19. The method of claim 11 wherein the step of providing the magnetic bias structure further includes:
 providing a soft magnetic bias structure.

* * * * *